(12) United States Patent
Ishii et al.

(10) Patent No.: US 7,341,793 B2
(45) Date of Patent: *Mar. 11, 2008

(54) TRANSPARENT HEAT-SEALING FILM

(75) Inventors: Masanori Ishii, Isezaki (JP); Masanori Higano, Isezaki (JP); Kazuhiro Kosugi, Isezaki (JP); Mikio Shimizu, Isezaki (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 295 days.

This patent is subject to a terminal disclaimer.

(21) Appl. No.: 11/119,692

(22) Filed: May 3, 2005

(65) Prior Publication Data

US 2005/0192404 A1 Sep. 1, 2005

Related U.S. Application Data

(63) Continuation of application No. 09/926,674, filed as application No. PCT/JP00/05828 on Aug. 29, 2000, now Pat. No. 6,902,795.

(30) Foreign Application Priority Data

Aug. 31, 1999 (JP) ................... 11-244419
Dec. 17, 1999 (JP) ................... 11-358664

(51) Int. Cl.
   *B32B 27/08* (2006.01)
(52) U.S. Cl. ........................... 428/483; 525/89
(58) Field of Classification Search ............. 525/89; 428/516, 517, 483
   See application file for complete search history.

(56) References Cited

U.S. PATENT DOCUMENTS

| 4,302,554 | A | * | 11/1981 | Nabeta et al. ................ 525/71 |
| 5,208,103 | A | | 5/1993 | Miyamoto et al. |
| 5,599,621 | A | | 2/1997 | Akhter |
| 5,670,254 | A | | 9/1997 | Akhter |
| 6,183,842 | B1 | | 2/2001 | Shimizu et al. |
| 6,902,795 | B1 | * | 6/2005 | Ishii et al. ................ 428/214 |

FOREIGN PATENT DOCUMENTS

| EP | 0 437 745 | | 7/1991 |
| JP | 54-120646 | | 9/1979 |
| JP | 03-221545 | * | 9/1991 |
| JP | 8-118566 | | 5/1996 |

OTHER PUBLICATIONS

Chemical Abstract, JP 54-120646, Sep. 19, 1979.

* cited by examiner

*Primary Examiner*—Jeffrey Mullis
(74) *Attorney, Agent, or Firm*—Oblon, Spivak, McClelland, Maier & Neustadt, P.C.

(57) ABSTRACT

A heat-sealing film having a haze of not more than 30% and having a sealant layer made of a resin composition which comprises from 50 to 100 wt % of the total of the following components (a) to (c):

(a) from 5 to 50 wt % of a block copolymer of from 50 to 95 wt % of a styrene-type hydrocarbon and from 5 to 50 wt % of a conjugated diene-type hydrocarbon,
(b) from 5 to 50 wt % of an ethylene/α-olefin random copolymer, and
(c) from 5 to 70 wt % of a block copolymer of from 10 to 50 wt % of a styrene-type hydrocarbon and from 50 to 90 wt % of a conjugated diene-type hydrocarbon, and
(d) from 0 to 50 wt % of an impact-resistant polystyrene.

4 Claims, No Drawings

TRANSPARENT HEAT-SEALING FILM

TECHNICAL FIELD

The present invention relates to a heat-sealing film to be used for a packaging container, particularly to a transparent heat-sealing film having a sealant layer made of a heat sealable resin composition, and a process for its production. Such a heat-sealing film is also called a cover film and is employed as a cover material for a plastic container, particularly a carrier container accommodating an electronic component.

BACKGROUND ART

A heat-sealing film for sealing a container made of e.g. plastic or paper, is used also as a cover film which is a cover material for packaging an electronic component, as represented, for example, by a carrier tape.

Such a heat-sealing film may be one having a two layer structure comprising a stretched film to maintain tear strength and break strength and to provide heat resistance for heat-sealing and a heat-sealing layer to present a fusion bonding property by heating. However, one having a three layer structure or a higher multilayer structure having an interlayer disposed between the stretched film and the heat-sealing layer, to provide an improvement of the mechanical strength, etc., is widely used. Such a cover film having a three layer or higher multilayer structure is produced by an extrusion-laminiating method by utilizing the heat-sealing property of the heat-sealing layer or the interlayer interposed between the heat-sealing layer and the stretched film. However, by this method, the number of extrusion-laminating steps increases as the number of layers increases, whereby there will be a problem such that the productivity deteriorates, or the raw fabric loss increases thereby to increase the cost. Also from the aspect of the quality of the product, the possibility of inclusion of foreign matters increases as the number of steps increases.

The heat-sealing film is required to have the following properties as the basic properties:

(1) a heat-sealing property to readily obtain practical peel strength, and
(2) a readily openable property so that at the time of opening, the content can easily be taken out without scattering. In recent years, an improvement is desired also with respect to (3) transparency. If the transparency is good, the packaged content can easily be ascertained, whereby the inspection operation may be facilitated, the reliability may be improved, and reassurance may be obtained.

For example, JP-B-57-53828 or JP-B-57-42652 discloses a heat-sealing film which is excellent in the heat-sealing property and which is readily openable. However, it does not necessarily fully satisfy the requirement for transparency. Accordingly, a heat-sealing film having better transparency is required.

DISCLOSURE OF THE INVENTION

The present invention is intended to provide a heat-sealing film excellent in transparency without losing the basic properties of a heat-sealing film.

Further, the present invention relates to a process for producing a heat-sealing film which is inexpensive and constant in its quality, by simplifying the process steps in the production of a multilayer film.

The present invention provides a heat-sealing film having a haze of not more than 30% and having a sealant layer made of a resin composition which comprises from 50 to 100 wt % of the total of the. following components (a) to (c):

(a) from 5 to 50 wt % of a block copolymer of from 50 to 95 wt % of a styrene-type hydrocarbon and from 5 to 50 wt % of a conjugated diene-type hydrocarbon,
(b) from 5 to 50 wt % of an ethylene/α-olefin random copolymer, and
(c) from 5 to 70 wt % of a block copolymer of from 10 to 50 wt % of a styrene-type hydrocarbon and from 50 to 90 wt % of a conjugated diene-type hydrocarbon, and
(d) from 0 to 50 wt % of an impact-resistant polystyrene.

The styrene-type hydrocarbon to be used in the present invention may, for example, be styrene, α-methlystrene and various alkyl-substituted styrenes. Among them, styrene is preferably employed. The conjugated diene-type hydrocarbon may, for example, be isoprene, butadiene or one having hydrogen added to such an unsaturated bond portion. Among such block copolymers of from 50 to 95 wt % of a styrene-type hydrocarbon and from 5 to 50 wt % of a conjugated diene-type hydrocarbon, one type may be used for each of components (a) and (c), but two or more types may also be used in combination. The α-olefin in the ethylene/α-olefin random copolymer may, for example, be propylene, butene, pentene or hexene.

The impact-resistant polystyrene comprises a styrene-type hydrocarbon polymer and a conjugated diene-type hydrocarbon polymer in such a manner that soft component particles made of the conjugated diene-type hydrocarbon polymer are dispersed in the styrene-type hydrocarbon polymer constituting a matrix.

The block copolymer of a styrene-type hydrocarbon and a conjugated diene-type hydrocarbon, the ethylene/α-olefin random copolymer and the impact-resistant polystyrene may, respectively, be commercial products.

The mixing ratio of the resin composition comprising components (a) to (d) is such that component (a) is from 5 to 50 wt %, component (b) is from 5 to 50 wt % and (c) is from 5 to 70 wt %, provided that the total amount of components (a) to (c) is from 50 to 100 wt %, and component (d) is from Q to 50 wt %.

If component (a) is less than 5 wt %, film-forming tends to be difficult, and if it exceeds 50 wt %, the temperature dependency of the peel strength tends to be remarkable, and the readily openable property tends to be impaired.

If component (b) is less than 5 wt %, no adequate peel strength tends to be obtained, and if it exceeds 50 wt %, adhesion to rolls during film-formation tends to increase, whereby the film-forming tends to be difficult.

If component (c) is less than 5 wt %, it tends to be difficult to obtain a sealing condition required to impart the readily openable property, and if it exceeds 70 wt %, film-forming tends to be difficult.

If component (d) exceeds 50 wt %, the transparency tends to be hardly obtainable.

The haze is an index for the degree of an opaque fogging state and is represented by a percentage of diffuse transmittance/total light transmittance when the diffuse transmittance and the total light transmittance are measured by means of an integrating sphere type light transmittance measuring apparatus. If the transparency is excellent, the diffuse transmittance will be small, and the smaller the haze value, the better the transmittance. The heat-sealing film of the present invention has a haze of not more than 30% and is excellent in transparency, whereby a packed content can easily be ascertained.

The thickness of the sealant layer is preferably less than 30 μm, more preferably from 4 μm to 25 μm. With a heat-sealing film having a sealant layer with a thickness of at least 30 μm, the transparency tends to be low, and the visual image of transparency tends to be impaired.

The heat-sealing film of the present invention is most preferably employed in such a construction that the biaxially stretched polyethylene terephthalate layer constitutes the outermost layer, the polyethylene resin layer constitutes the second layer in contact with the outermost layer, and the polyolefin type resin layer constitutes the third layer in contact with the second layer, and the above-mentioned sealant layer constitutes the fourth layer in contact with the third layer.

As the biaxially oriented polyethylene terephthalate to be used for the biaxially oriented polyethylene terephthalate layer, not only one which is commonly used, but also one having an antistatic agent coated or kneaded for antistatic treatment or having corona treatment, etc. applied, may be employed.

For the polyethylene resin layer, low density polyethylene, linear low density polyethylene or ultralow density polyethylene may, for example, be employed, and these polyethylenes may be used alone or in combination as a mixture of two or more of them. Further, ethylene-1-butene, a copolymer of ethylene with a vinyl group having a carboxyl group, such as an ethylene/acrylate or ethylene/vinyl acetate copolymer, or a three component copolymer thereof with an acid anhydride, may be blended for use.

To provide adequate bond strength between the outermost layer and the second layer, various anchor coating agents or surface treating techniques which are commonly employed, may be used. As an anchor coating agent, a two part curable isocyanate type anchor coating agent may be employed especially for enhancing the adhesion between the biaxially oriented polyethylene terephthalate and the polyethylene resin. Further, in order to enhance the adhesion between the anchor coating agent and the biaxially oriented polyethylene terephthalate film, corona treatment may be applied to the biaxially oriented polyethylene terephthalate film side, and ozone treatment may be applied to the polyethylene resin side.

The polyolefin resin to be used for the polyolefin type resin layer may, for example, be an ethylene/1-butene copolymer, an ethylene/vinyl acetate copolymer, an ethylene/acrylate copolymer, an ethylene/maleic acid copolymer, a styrene/ethylene graft copolymer, a styrene/propylene graft copolymer, a styrene/ethylene/butadiene block copolymer, a propylene polymer, an ethylene polymer, or a blend product thereof.

The heat-sealing film obtained by the present invention may have at least one side treated by antistatic treatment. The antistatic treatment may be carried out by coating a surfactant type antistatic agent, a polymer type antistatic agent or a conductive agent, as an antistatic agent, by spraying or by a roll coater employing e.g. a gravure roll.

The heat-sealing film comprising a biaxially oriented polyethylene terephthalate layer as the outermost layer, a polyethylene resin layer as the second layer, a polyolefin type resin layer as the third layer and the sealant layer as the fourth layer, can be produced by a process which comprises a step of coating an AC agent on the biaxially oriented polyethylene terephthalate film of the outermost layer, a step of extrusion-coating the polyethylene resin of the second layer, and a step of coextrusion-coating the polyolefin type resin layer of the third layer and the sealant layer of the fourth layer.

Otherwise, it can also be produced by a process which comprises a step of coating an AC agent on the biaxially oriented polyethylene terephthalate film of the outer-most layer, and a step of extrusion-laminating a coextruded film comprising the polyolefin type resin layer of the third layer and the sealant layer of the fourth layer, via the polyethylene resin of the second layer.

The resins and the resin composition to be used for the sealant layer may, for example, be high density polyethylene, low density polyethylene, linear low density polyethylene, polypropylene, polybutene-1, poly-4-methylpentene-1, an ethylene/propylene copolymer, an ethylene-1-butene copolymer, an ethylene/vinyl acetate copolymer, an ethylene/acrylate copolymer, a styrene/butadiene copolymer and its hydrogenated product, a thermoplastic polyurethane, and a blend product thereof. Preferred is a resin composition which comprises from 50 to 100 wt % of a mixture comprising:

(a) from 5 to 50 wt % of a block copolymer of from 50 to 95 wt % of a styrene-type hydrocarbon and from 5 to 50 wt % of a conjugated diene-type hydrocarbon, (b) from 5 to 50 wt % of an ethylene/α-olefin random copolymer, and (c) from 5 to 70 wt % of a block copolymer of from 10 to 50 wt % of a styrene-type hydrocarbon and from 50 to 90 wt % of a conjugated diene-type hydrocarbon, and (d) from 0 to 50 wt % of an impact-resistant polystyrene.

As a machine for the production by the present invention, a common laminator may be employed, and a tandem laminator may preferably be employed. As a coater to coat an AC agent to the biaxially oriented polyethylene terephthalate film, a commonly employed coater such as a roll coater, a gravure coater, a reverse roll coater, a bar coater or a die coater, may, for example, be employed.

A T-die may be employed as a die for the laminator which extrudes the polyethylene resin. Further, it may be provided with a dicker to adjust the film width.

The laminator die for coextrusion of the polyolefin-type resin layer and the sealant layer may, for example, be a T-die provided with a feed block which is commonly used for coextrusion, a multi manifold die or a dual slot die.

The polyolefin-type resin layer of the third layer and the sealant layer of the fourth layer may be formed into a double layer film by a coextrusion method. Especially, by a method of obtaining a double layer film by a T-die method, the molten resin discharged from the die will be nipped by specular rolls, whereby the transparency will be increased. If it is attempted to obtain a single layer film of the sealant layer only, as the thickness is less than 30 μm in the present invention, it tends to be difficult to attain a good thin thickness accuracy or to attain adequate peel strength constantly, whereby the transparency tends to be irregular. Whereas, by the coextrusion with the olefin-type resin, it is possible to obtain a sealant layer having a constant thickness. The obtained double layer film can be laminated with the biaxially oriented polyethylene terephthalate layer via a molten polyethylene resin layer as the second layer, to obtain a heat-sealing film.

In the present invention, in addition to the above steps, a step of antistatic treatment may further be added, as the case requires. As an antistatic agent, a surfactant type antistatic agent, a polymer type antistatic agent or a conductive agent, may, for example, be coated by spraying or by a roll coater employing a gravure roll. Further, in order to apply such an antistatic agent uniformly, the film surface may preferably be treated by corona treatment or ozone treatment, particularly preferably by corona discharge treatment, prior to the antistatic treatment.

The heat-sealing film of the present invention may be used for a cover tape for a carrier tape for a packaged electronic component or a carrier bag for an electronic component, which has functions to protect an electronic component from pollution during the storage, transportation or mounting and to align and take out the electronic component to mount it on an electronic circuit board.

BEST MODE FOR CARRYING OUT THE INVENTION

Now, the present invention will be described in further detail with reference to Examples and Comparative Examples.

EXAMPLES 1 to 6

For a heat-sealing resin mixture (for a sealant layer), (a) a styrene/butadiene block copolymer resin ("Denka Clearene", manufactured by Denki Kagaku Kogyo K.K., styrene content: 80 wt %, butadiene content: 20 wt %), (b) an ethylene/butene-1 random copolymer ("Toughmer A", manufactured by Mitsui Chemical Co., Ltd.), (c) a styrene/butadiene block copolymer ("STR resin", manufactured by Nippon Synthetic Rubber Co., Ltd., styrene content: 40 wt %, butadiene content: 60 wt %) and (d) an impact-resistant polystyrene resin ("Denka Styrol HI-E6", manufactured by Denki Kagaku Kogyo K.K.) were manually blended to have a composition as identified in Table 1 and compounded by a 40 mm single screw extruder at 200° C. to obtain a resin composition.

This resin composition and low density polyethylene as a polyolefin type resin were subjected to coextrusion by a T-die method to obtain a double layer film (total thickness: 30 μm) having a sealant layer thickness as identified in Table 2. This double layer film was laminated with a biaxially oriented polyethylene terephthalate film (thickness: 12 μm) via a polyethylene resin (thickness: 15 μm) by an extrusion-laminating method to obtain a heat-sealing film.

COMPARATIVE EXAMPLES 1 to 5

In the same manner as described above, components (a) to (d) were blended to have a composition as identified in Table 1 to obtain a heat-sealing resin mixture. Then, the mixture was coextruded with low density polyethylene to obtain a film having a thickness as identified in Table 2, which was laminated with a biaxially oriented polyethylene terephthalate film by a dry laminating method to obtain a transparent laminated heat-sealing film (total thickness: 30 μm except for Comparative Example 5 wherein the total thickness was 40 μm).

The following evaluations were carried out with respect to the films thus obtained.

Evaluation of Transparency (Measurement of Haze)

The haze was measured by means of an integrating sphere type measuring apparatus specified in Measurement Method A in accordance with JIS K7105 (1998). The unit is %. The results are shown in Table 2.

Evaluation of Heat-Sealing Property and Readily Openable Property

A heat-sealing film was sealed on a polystyrene type carrier tape for electronic packaging material at 150° C. under conditions such that the seal head width was 0.5 mm×2, the sealing pressure was 0.4 MPa and the sealing speed was 2 times/sec. One having an average peel strength within a range of from 0.2N to 0.6N was identified with symbol ○, and one having an average peel strength outside the range was identified with symbol X. The results are shown in the column for "Heat-sealing property" in Table 2. Further, one having a difference between the maximum value and the minimum value of peel strength of at most 0.4N, was identified with symbol ○, and one having the difference outside such a range, was identified with symbol X. The results are shown in the column for "Readily openable property" in Table 2.

TABLE 1

| Composition | | | | | Resin composition | |
| No. | (a) | (b) | (c) | (a) + (b) + (c) | (a) + (b) + (c) | (d) |
| --- | --- | --- | --- | --- | --- | --- |
| 1 | 45 | 25 | 30 | 100 | 90 | 10 |
| 2 | 5 | 45 | 50 | 100 | 55 | 45 |
| 3 | 28 | 7 | 65 | 100 | 70 | 30 |
| 4 | 45 | 45 | 10 | 100 | 100 | 0 |
| 5 | 55 | 25 | 20 | 100 | 90 | 10 |
| 6 | 20 | 60 | 20 | 100 | 90 | 10 |
| 7 | 15 | 10 | 75 | 100 | 90 | 10 |
| 8 | 45 | 25 | 30 | 100 | 40 | 60 |

TABLE 2

| | Composition No. | Thickness of sealant layer (μm) | Heat-sealing property | Readily openable property | Haze (%) |
| --- | --- | --- | --- | --- | --- |
| Example 1 | 1 | 10 | ○ | ○ | 13 |
| Example 2 | 2 | 10 | ○ | ○ | 25 |
| Example 3 | 3 | 10 | ○ | ○ | 28 |
| Example 4 | 4 | 10 | ○ | ○ | 14 |
| Example 5 | 1 | 25 | ○ | ○ | 22 |
| Example 6 | 1 | 4 | ○ | ○ | 8 |
| Comp. Ex. 1 | 5 | 10 | ○ | X | 14 |
| Comp. Ex. 2 | 6 | 10 | — | — | — |
| Comp. Ex. 3 | 7 | 10 | — | — | — |
| Comp. Ex. 4 | 8 | 10 | ○ | ○ | 45 |
| Comp. Ex. 5 | 1 | 35 | ○ | ○ | 32 |

Note: Symbol — indicates that measurements were impossible due to too much fluctuations in thickness.

The heat-sealing films of Examples were heat-sealing films excellent in transparency without losing the basic characteristics such that they are excellent in the heat-sealing property to readily obtain practical peel strength and have a readily openable property whereby the content can easily be taken out without scattering at the time of opening.

EXAMPLE 7

Preparation of a Polystyrene Type Resin for the Sealant Layer (a) A styrene/butadiene block copolymer resin (Denka Clearene, tradename, manufactured by Denki Kagaku Kogyo K.K., styrene content: 80 wt %, butadiene content: 20 wt %), (b) an ethylene/butene-1 random copolymer ("Toughmer A", tradename, manufactured by Mitsui Chemical Co., Ltd.), (c) a styrene/butadiene block copolymer resin ("STR resin", tradename, manufactured by Nippon Synthetic Rubber Co., Ltd., styrene content: 40 wt %, butadiene content: 80 wt %) and (d) an impact-resistant polystyrene resin ("Denka Styrol HI-E6", tradename, manufactured by Denki Kagaku Kogyo K.K.) were blended in proportions of 40, 25, 25 and 10 wt %, respectively, and melt-kneaded by a 40 mm single screw extruder at a temperature of 200° C. to obtain resin pellets for the desired sealant layer.

By means of a tandem laminator, a biaxially oriented polyethylene terephthalate film (Toyobo Ester Film, tradename, manufactured by Toyo Boseki K.K., thickness: 16 μm) was supplied, and an isocyanate type two part curable AC agent ("Takelac A971, Takenate A3", tradename, manufactured by Takeda Chemical Industries, Co., Ltd.) was coated by an AC coater and dried to obtain a coated film, which was coated with a low density polyethylene resin ("Novatec LD", tradename, manufactured by Nippon Polychem K.K.) extruded at a temperature of 320° C. by a 65 mm extrusion laminator provided with a T-die, in a thickness of 13 μm. Further, on this film, a low density polyethylene ("UBE Polyethylene", tradename, manufactured by Ube Kosan K.K.) and the polystyrene type resin for the sealant layer prepared as described above, were coextrusion-coated at a temperature of 230° C. by a 65 mm extrusion laminator provided with a multi manifold die, so that the thicknesses of the polyethylene and the polystyrene type resin would be 30 and 10 μm, respectively, to obtain a four-layer heat-sealing film.

EXAMPLE 8

By means of a tandem laminator, a biaxially oriented polyethylene terephthalate film ("Toyobo Ester film", tradename, manufactured by Toyo Boseki K.K., thickness: 16 μm) was supplied, and an isocyanate type two part curable AC agent ("Takelac A971, Takenate A3", tradename, manufactured by Takeda Chemical Industries, Co., Ltd.) was coated by an AC coater and dried to obtain a coated film, which was then coated with a low density polyethylene resin ("Novatec LD", tradename, manufactured by Nippon Polychem K.K.) extruded at a temperature of 320° C. from a 65 mm extrusion laminator provided with a T-die, in a thickness of 13 μm. Further, on this film, a low density polyethylene ("UBE Polyethylene", tradename, manufactured by Ube Kosan K.K.) and the polystyrene type resin for the sealant layer prepared as described above, were coextrusion-coated at a temperature of 230° C. by a 65 mm extrusion laminator provided with a multi manifold die, so that the thicknesses of the polyethylene and the polystyrene type resin would be 30 and 10 μm, respectively, to obtain a four-layer heat-sealing film. Then, the film surface was subjected to corona treatment by a corona treatment machine. Then, a surfactant type antistatic agent ("SAT-4", tradename, manufactured by Nippon Junyaku K.K.) was sprayed to obtain the desired film.

EXAMPLE 9

By means of a tandem laminator, a biaxially oriented polyethylene terephthalate film ("Toyobo Ester film", tradename, manufactured by Toyo Boseki K.K., thickness: 16 μm) was supplied, and an isocyanate type two part curable AC agent ("Takelac A971, Takenate A3", tradename, manufactured by Takeda Chemical Industries, Co., Ltd.) was coated by an AC coater and dried to obtain a coated film. Whereas, a low density polyethylene ("UBE Polyethylene", tradename, manufactured by Ube Kosan K.K.) and the polystyrene type resin for the sealant layer prepared as described above, were coextruded at a temperature of 230° C. by a 65 mm extrusion laminator provided with a multi manifold die, so that the thicknesses of the polyethylene and the polystyrene type resin would be 30 and 10 μm, respectively, to obtain a coextruded film. Then, the coated film and the coextruded film were extrusion-laminated via a low density polyethylene resin ("Novatec LD", tradename, manufactured by Nippon Polychem K.K.) extruded at a temperature of 320° C. by a 65 mm extrusion laminator equipped with a T-die, so that the thickness of the polyethylene resin would be 13 μm, to obtain a four-layer heat-sealing film.

EXAMPLE 10

By means of a tandem laminator, a biaxially oriented polyethylene terephthalate film ("Toyobo Ester film", tradename, manufactured by Toyo Boseki K.K., thickness: 16 μm) was supplied, and an isocyanate type two part curable AC agent ("Takelac A971, Takenate A3", tradename, manufactured by Takeda Chemical Industries, Co., Ltd.) was coated by an AC coater and dried to obtain a coated film. Whereas, a low density polyethylene ("UBE Polyethylene", tradename, manufactured by Ube Kosan K.K.) and the polystyrene type resin for the sealant layer prepared as described above, were coextruded at a temperature of 230° C. by a 65 mm extrusion laminator provided with a multi manifold die, so that the thicknesses of the polyethylene and the polystyrene type resin would be 30 and 10 μm, respectively, to obtain a coextruded film. Then, the coated film and the coextruded film were extrusion-laminated via a low density polyethylene resin ("Novatec LD", tradename, manufactured by Nippon Polychem K.K.) extruded at a temperature of 320° C. by a 65 mm extrusion laminator provided with a T-die, so that the thickness of the polyethylene resin would be 13 μm, to obtain a desired four-layer heat-sealing film. Then, the film surface was subjected to corona treatment by a corona treatment machine, and then a surfactant type antistatic agent ("SAT-4", tradename, manufactured by Nippon Junyaku K.K.) was sprayed thereon to obtain a desired film.

According to the production processes of the above Examples, in the production of multilayer films, the process steps can be simplified, the number of operators can be reduced, and the low fabric loss can be reduced, thus contributing to reduction of costs, and further, heat-sealing films having constant quality, can be obtained.

The invention claimed is:

1. A cover tape for an electronic component carrier tape, comprising:
   a heat sealing film having a haze of not more than 30% and having a sealant layer comprising a resin composition comprising from 50 to 100 wt % of the total of the following components (a) to (c):
   (a) from 5 to 50 wt % of a block copolymer of from 50 to 95 wt % of a styrene hydrocarbon and from 5 to 50 wt % of a conjugated diene-type hydrocarbon,
   (b) from 5 to 50 wt % of an ethylene/α-olefin random copolymer, and
   (c) from 5 to 70 wt % of a block copolymer of from 10 to 50 wt % of a styrene hydrocarbon and from 50 to 90 wt % of a conjugated diene-type hydrocarbon, and
   (d) from 0 to 50 wt % of an impact-resistant polystyrene, wherein the heat sealing film comprises a biaxially oriented polyethylene terephthalate layer as the outermost layer, a polyethylene resin layer as the second layer, a polyolefin type resin layer as the third layer and the sealant layer as the fourth layer, wherein (i) the polyethylene resin layer is disposed between the polyethylene terephthalate layer and the polyolefin type resin layer, and (ii) the polyolefin type resin layer is disposed between the polyethylene resin layer and the sealant layer.

2. The cover tape as claimed in claim 1, wherein the sealant layer has a thickness of less than 30 µm.

3. The cover tape as claimed in claim 1, wherein the heat-sealing film has antistatic treatment applied to at least one side.

4. A sealed electronic component carrier tape, comprising an electronic component carrier tape having affixed thereto a cover tape as claimed in claim 1.

* * * * *